(12) United States Patent
Broughton (10) Patent No.: US 10,794,567 B2
(45) Date of Patent: Oct. 6, 2020

(54) OPTICAL SYSTEM FOR MANAGING LIGHT FROM A LIGHT EMITTING DIODE

(71) Applicant: SIGNIFY HOLDING B.V., Eindhoven (NL)

(72) Inventor: Kevin Charles Broughton, Sharpsburg, GA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 12 days.

(21) Appl. No.: 15/885,466

(22) Filed: Jan. 31, 2018

(65) Prior Publication Data

US 2018/0216798 A1 Aug. 2, 2018

Related U.S. Application Data

(60) Provisional application No. 62/452,811, filed on Jan. 31, 2017.

(51) Int. Cl.
| | |
|---|---|
| *F21V 5/04* | (2006.01) |
| *F21V 5/00* | (2018.01) |
| *F21V 13/04* | (2006.01) |
| *F21V 7/00* | (2006.01) |
| *F21Y 115/10* | (2016.01) |
| *F21V 7/10* | (2006.01) |

(52) U.S. Cl.
CPC .............. *F21V 5/046* (2013.01); *F21V 5/007* (2013.01); *F21V 5/045* (2013.01); *F21V 7/0091* (2013.01); *F21V 13/04* (2013.01); *F21V 7/10* (2013.01); *F21Y 2115/10* (2016.08)

(58) Field of Classification Search
CPC ...... F21V 13/04; F21V 13/045; F21V 7/0091; F21V 5/0048
See application file for complete search history.

(56) References Cited

U.S. PATENT DOCUMENTS

| | | | |
|---|---|---|---|
| 2,215,900 A | 9/1940 | Bitner | |
| 7,181,378 B2 | 2/2007 | Benitez et al. | |
| 8,152,327 B2 | 4/2012 | Brands et al. | |
| 8,371,710 B2 | 2/2013 | Gupta et al. | |
| 2008/0291682 A1* | 11/2008 | Falicoff | G02B 5/12 362/310 |
| 2009/0109687 A1 | 4/2009 | Householder et al. | |
| 2009/0201677 A1* | 8/2009 | Hoelen | F21S 10/02 362/231 |
| 2009/0225552 A1* | 9/2009 | Chen | F21V 5/04 362/333 |

OTHER PUBLICATIONS

International Search Report for PCT/US2018/016252, dated May 4, 2018.

\* cited by examiner

*Primary Examiner* — Sean P Gramling
(74) *Attorney, Agent, or Firm* — Akarsh P. Belagodu (57) ABSTRACT

An optical system includes an optic and a reflector. The optic has a rear surface with a cavity configured to receive light from a light source and a front surface opposite the rear surface, the front surface configured to emit light processed by the optic and the front surface including a centrally disposed convex region. The front surface and the rear surface of the optic meet at a rim that extends peripherally with respect to the cavity. The reflector is disposed adjacent the optic and comprises a light-receiving end adjoining the rim, a light-emitting end, and a tapered region that extends between the light-receiving end and the light-emitting end.

20 Claims, 14 Drawing Sheets

OPTICAL SYSTEM FOR MANAGING LIGHT FROM A LIGHT EMITTING DIODE

RELATED APPLICATIONS

The present application claims priority under 35 U.S.C. § 119(e) to U.S. Provisional Patent Application No. 62/452,811, filed Jan. 31, 2017, and titled "Optical System For Managing Light From a Light Emitting Diode," the entire contents of which are incorporated herein by reference.

TECHNICAL FIELD

Embodiments of the technology relate generally to illumination systems and more particularly to an optical system that manages light from at least one light emitting diode (LED).

BACKGROUND

For illumination applications, light emitting diodes offer substantial potential benefits associated with their energy efficiency, light quality, and compact size. However, to realize the full potential benefits offered by light emitting diodes, new technologies are needed.

For instance, there are needs in the art for managing light emitted by single light emitting diodes, large chip-on-board (COB) light emitting diodes, and arrays of light emitting diodes. Such needs include improvements for processing the emitted light from one or more light emitting diodes in a manner that provides controlled illumination, for example in a high-output lighting system that may be suitable for illuminating a football field or another sporting venue. Such needs also include improved optics that are compact in size and that can process light from light emitting diodes that are larger in size.

A capability addressing one or more such needs, or some other related deficiency in the art, would support improved illumination systems and more widespread utilization of light emitting diodes in illumination applications.

SUMMARY

In one embodiment, the present disclosure is directed to an optic comprising a rear surface with a cavity configured to receive light from a light source. The optic further comprises a front surface configured to emit light processed by the optic, the front surface comprising a centrally disposed convex region. The front surface and the rear surface of the optic meet to form a rim that extends peripherally with respect to the cavity. The front surface further comprising a concave region disposed between the rim and the centrally disposed convex region, the concave region extending peripherally about the centrally disposed convex region.

In another embodiment, the present disclosure is directed to a system comprising an optic and a reflector. The optic comprises a rear surface with a cavity configured to receive light from a light source and a front surface opposite the rear surface, the front surface configured to emit light processed by the optic and the front surface comprising a centrally disposed convex region. The front surface and the rear surface of the optic meet at a rim that extends peripherally with respect to the cavity. The reflector is disposed adjacent the optic and comprises a light-receiving end adjoining the rim, a light-emitting end, and a tapered region that extends between the light-receiving end and the light-emitting end.

In yet another embodiment, the present disclosure is directed to a lighting system comprising a substrate, at least one light emitting diode mounted on the substrate, an optic mounted on the substrate, and a reflector. The optic comprises a cavity disposed to receive light from the at least one light emitting diode, a totally internally reflective surface that extends circumferentially about the cavity, a refractive surface that is disposed to emit an emitted light, and a rim formed between the totally internally reflective surface and the refractive surface. The reflector comprises a light-receiving end that adjoins the rim and a light-emitting end.

These and other aspects, objects, features, and embodiments will be apparent from the following description and the appended claims.

BRIEF DESCRIPTION OF THE FIGURES

The drawings illustrate only example embodiments of methods, systems, and devices for optical systems comprising a refractor and a reflector and are therefore not to be considered limiting in scope, as they may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles. In the drawings, reference numerals designate like or corresponding, but not necessarily identical, elements.

DETAILED DESCRIPTION OF EXAMPLE EMBODIMENTS

In some example embodiments as described herein, a lighting system can comprise an optical system that receives light emitted from a light source, for example a light emitting diode source, and that processes (e.g., refracts, reflects, or otherwise modifies) the received light to provide illumination. In some example embodiments as described herein, the lighting system can comprise an optic or an optic and an associated reflector. In some example embodiments, the lighting system can be sized to deliver a high level of illumination in the form of a narrow beam floodlight, such as may be utilized in an outdoor sporting venue.

Some representative embodiments will be described more fully hereinafter with example reference to the accompanying drawings that illustrate embodiments of the technology. The technology may, however, be embodied in many different forms and should not be construed as limited to the embodiments set forth herein; rather, these embodiments are provided so that this disclosure will be thorough and complete, and will fully convey the scope of the technology to those appropriately skilled in the art.

The drawings illustrate only example embodiments and are therefore not to be considered limiting of the embodiments described, as other equally effective embodiments are within the scope and spirit of this disclosure. The elements and features shown in the drawings are not necessarily drawn to scale, emphasis instead being placed upon clearly illustrating principles of the embodiments. Additionally, certain dimensions or positions may be exaggerated to help visually convey certain principles. In the drawings, similar reference numerals among different figures designate like or corresponding, but not necessarily identical, elements.

Figure 1A:
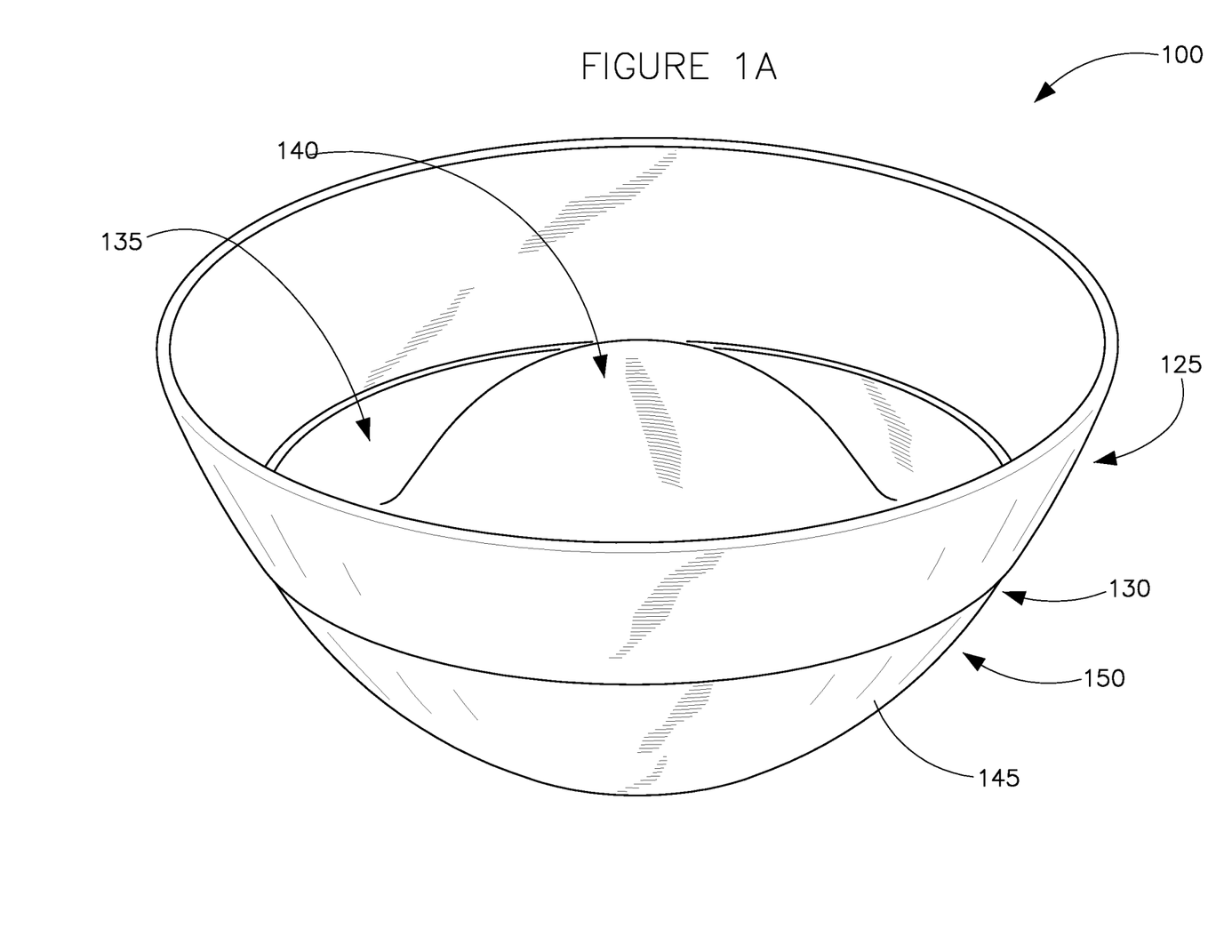
FIG. 1A illustrates a side perspective view of an optical system in accordance with an example embodiment of the present disclosure.
Figure 1B:
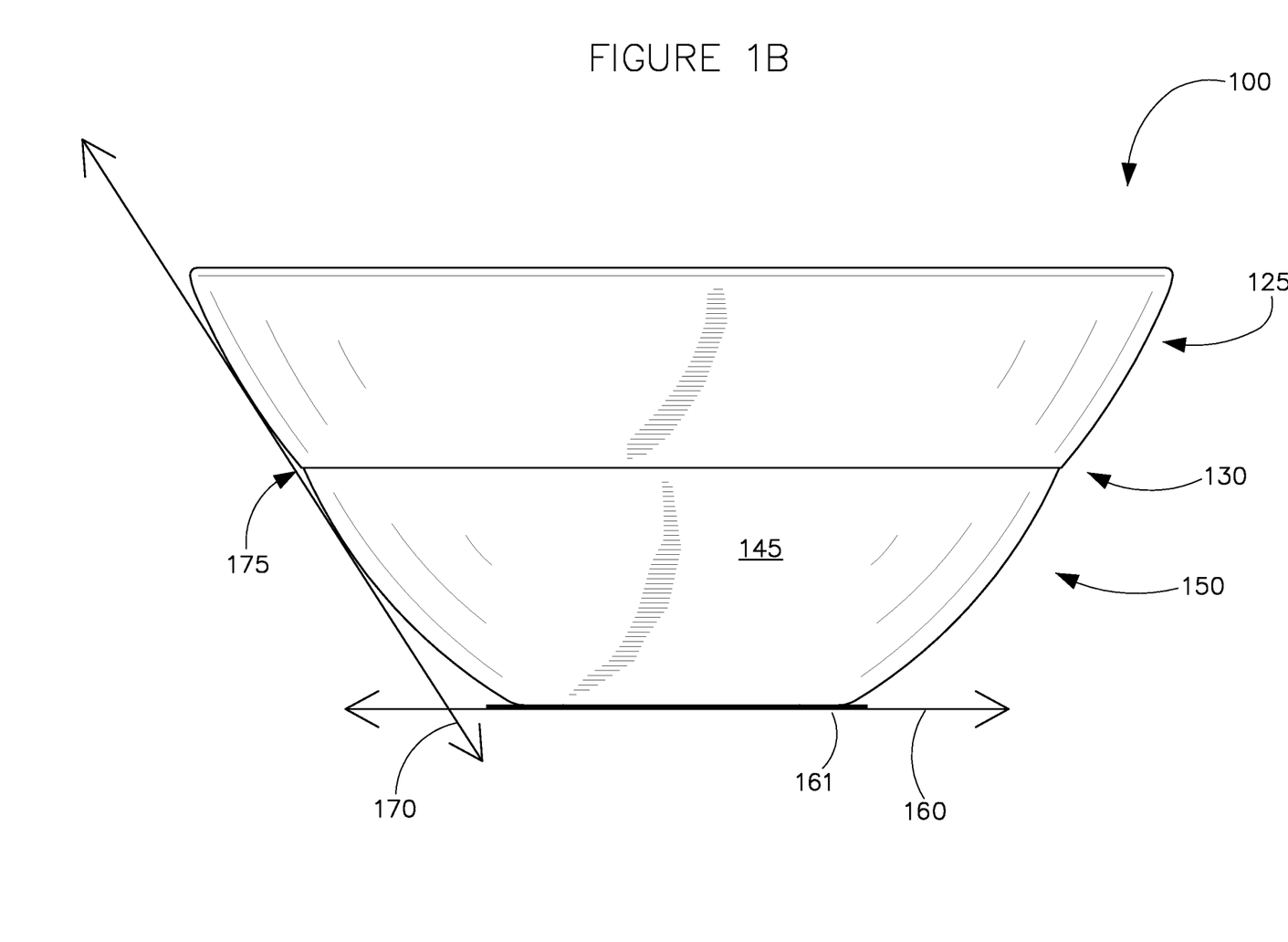
FIG. 1B illustrates a side view of the optical system of FIG. 1A in accordance with an example embodiment of the present disclosure.
Figure 1C:
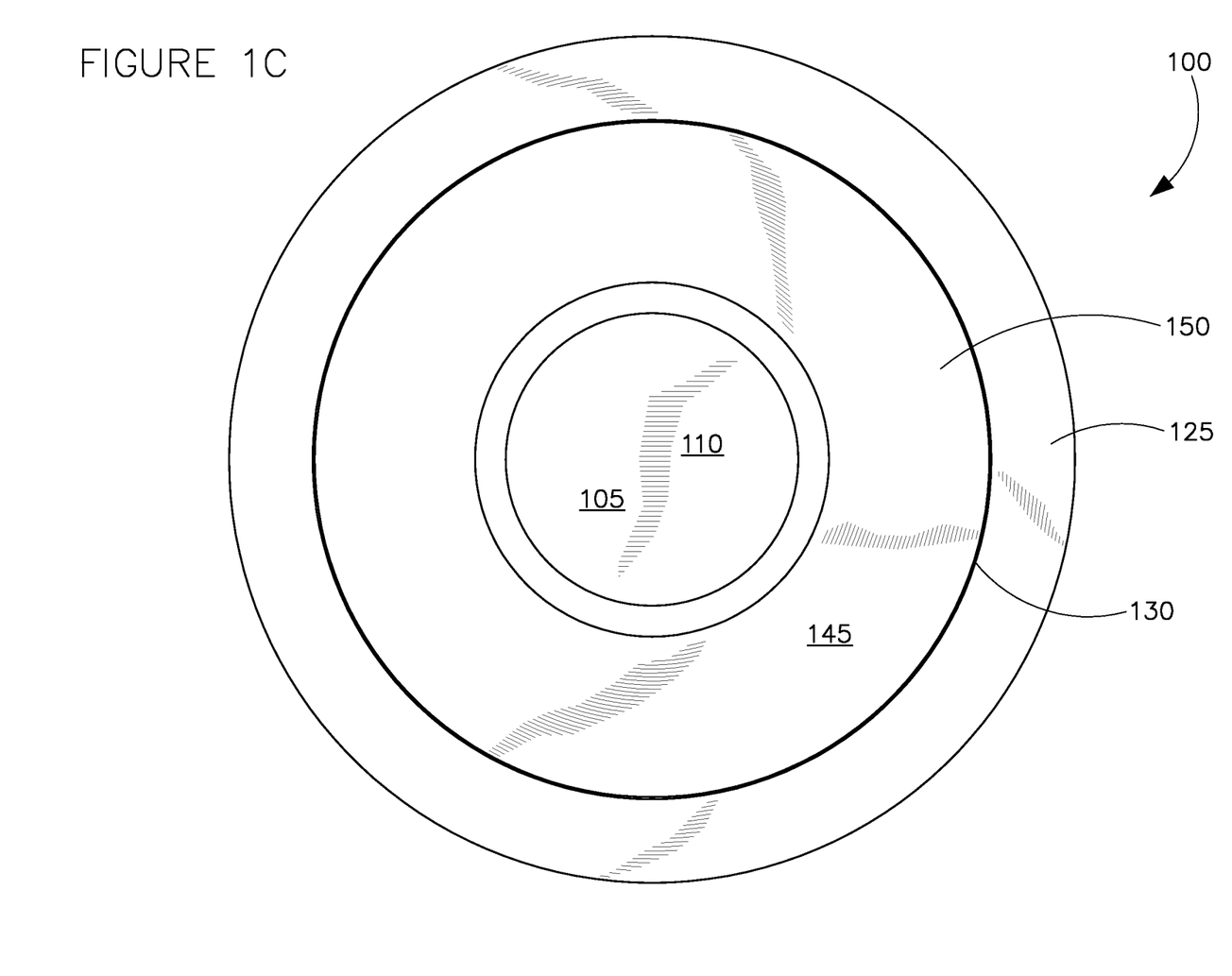
FIG. 1C illustrates a rear view of the optical system of FIG. 1A in accordance with an example embodiment of the present disclosure.
Figure 1D:
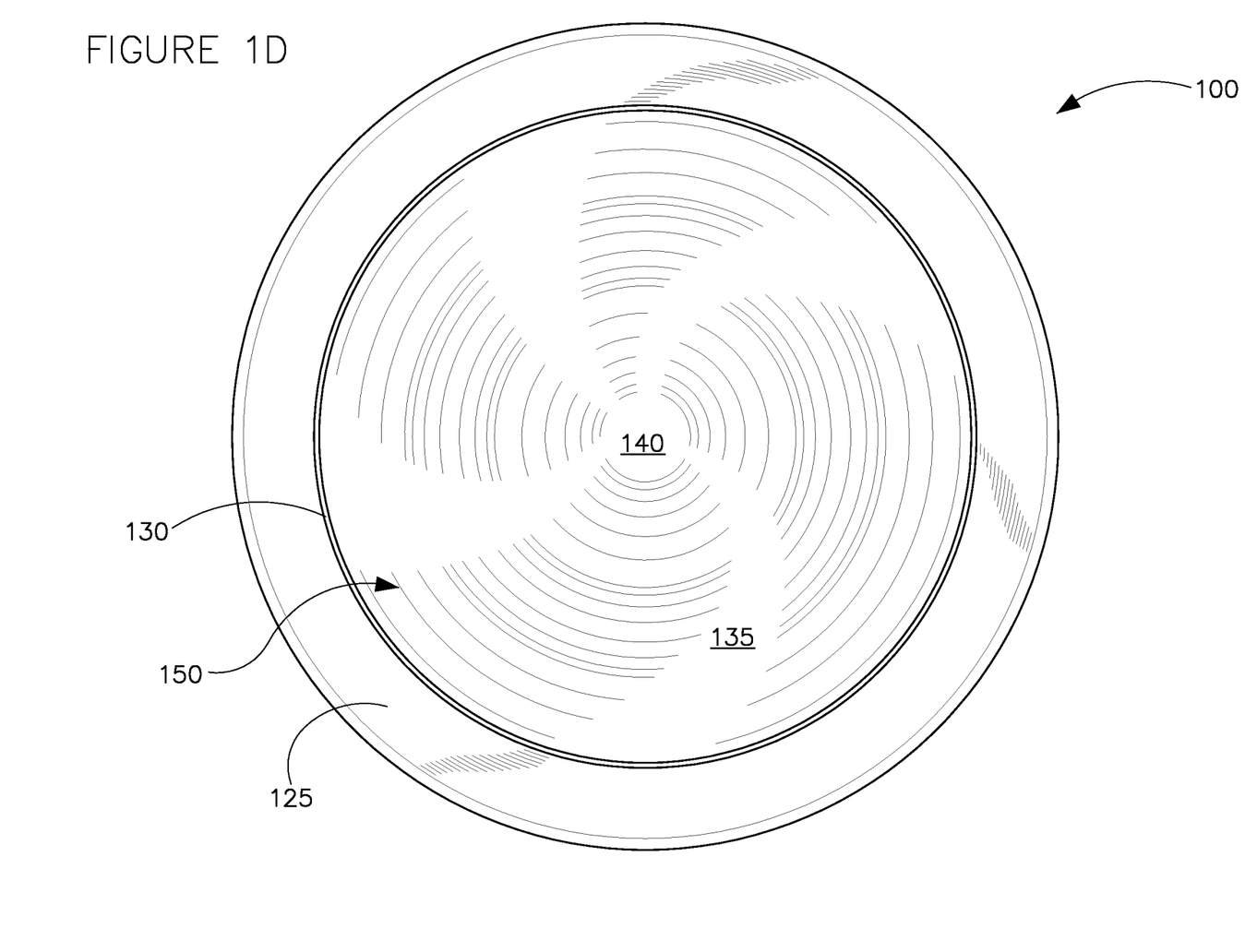
FIG. 1D illustrates a front view of the optical system of FIG. 1A in accordance with an example embodiment of the present disclosure.

FIGS. 1A, 1B, 1C, and 1D (collectively FIG. 1) illustrate an example optical system 100 comprising an optic 150 and an associated reflector 125. In FIG. 1, the optic 150 is illustrated as opaque to promote viewing but may be optically clear in physical implementation. The optic 150 can have a composition of clear silicone, clear acrylic, or other appropriate optical-grade polymer, for example. FIG. 1A illustrates a side perspective view of the optical system 100. FIG. 1B illustrates a side view of the optical system 100. FIG. 1C illustrates a rear view of the optical system 100. FIG. 1D illustrates a front view of the optical system 100.

Figure 2A:
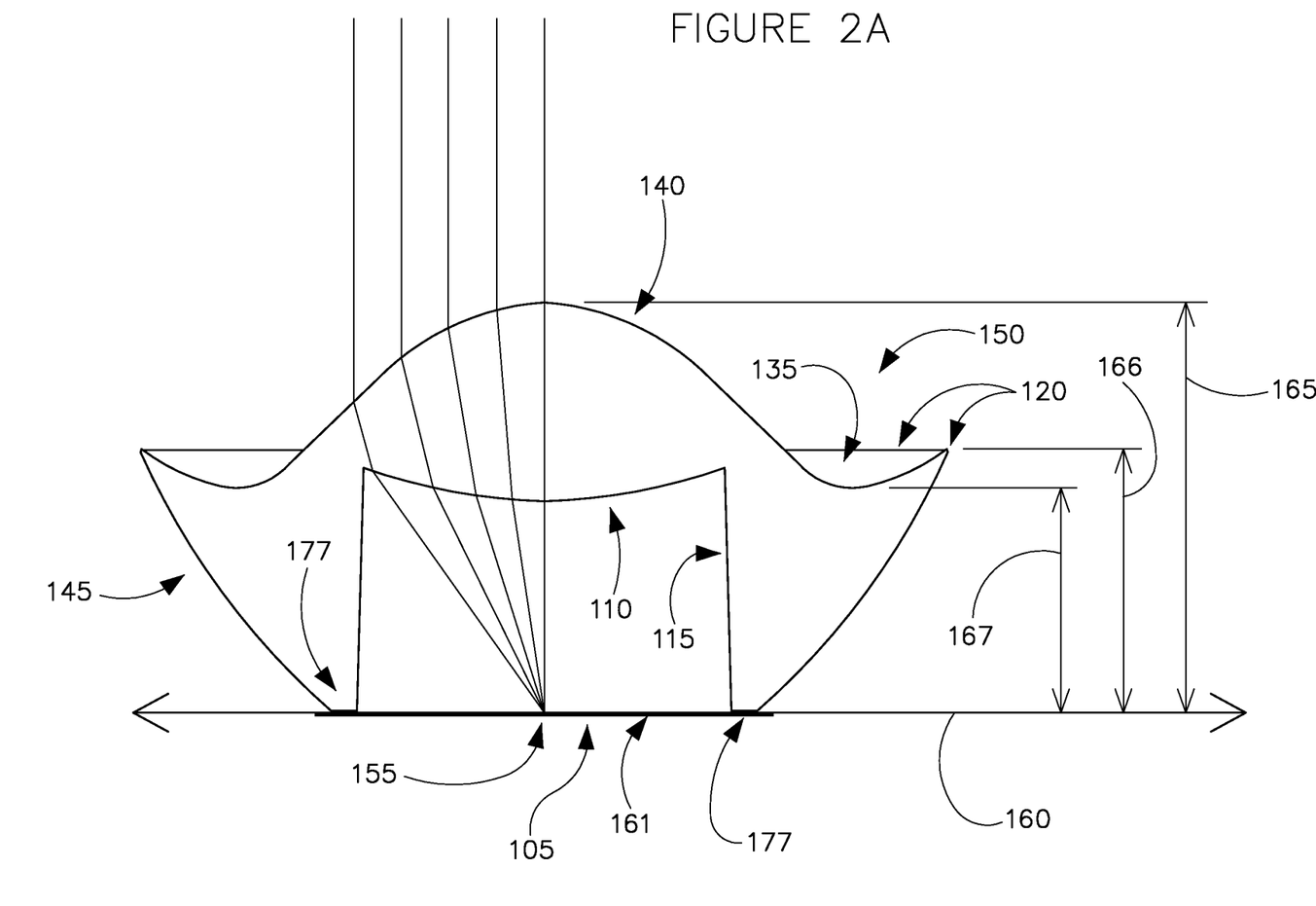
FIGS. 2A, 2B, and 2C illustrate side cross sectional views of the optic portion of the optical system of FIG. 1A overlaid with representative ray traces from a light source in accordance with an example embodiment of the present disclosure.
Figure 2B:
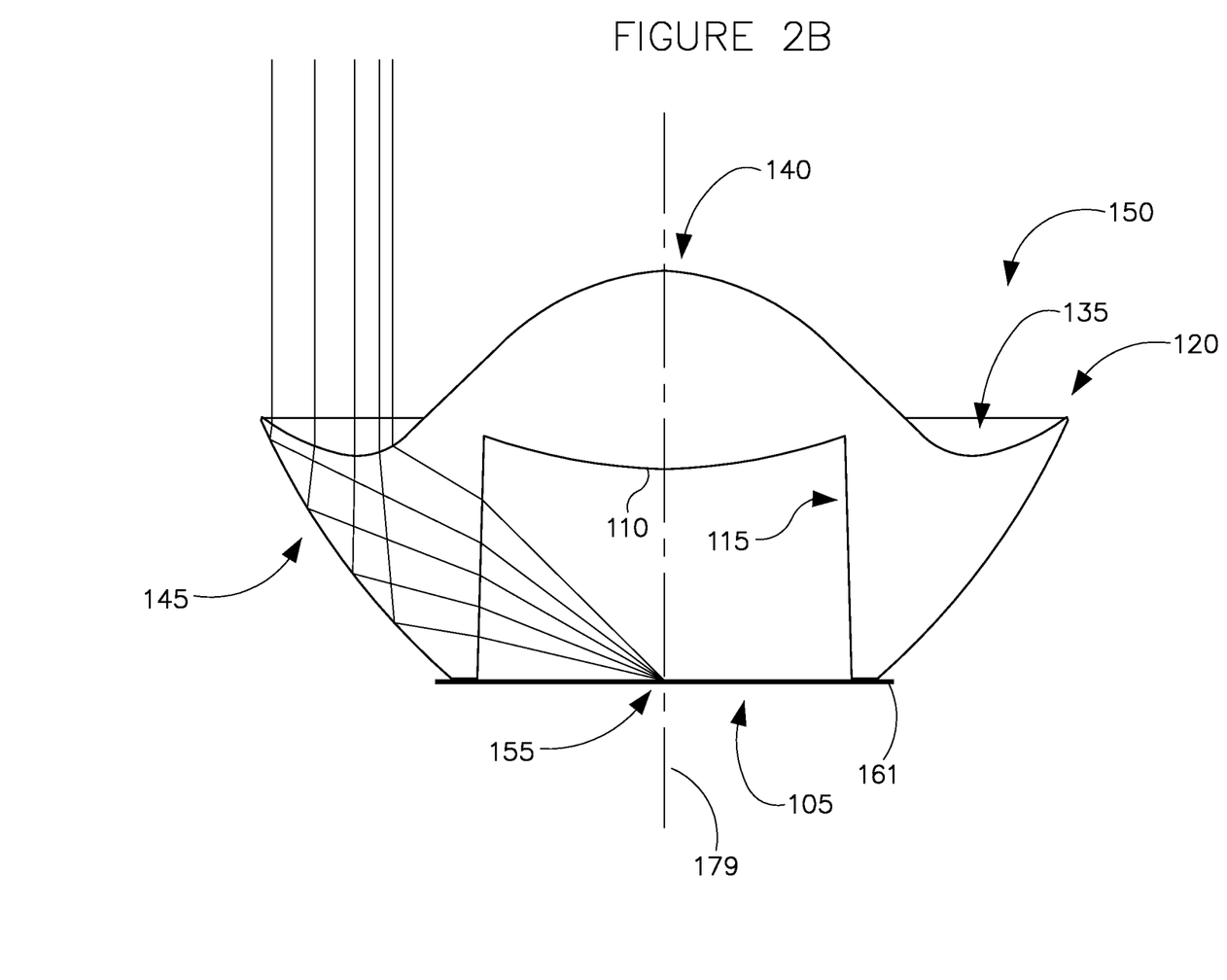
Figure 2C:
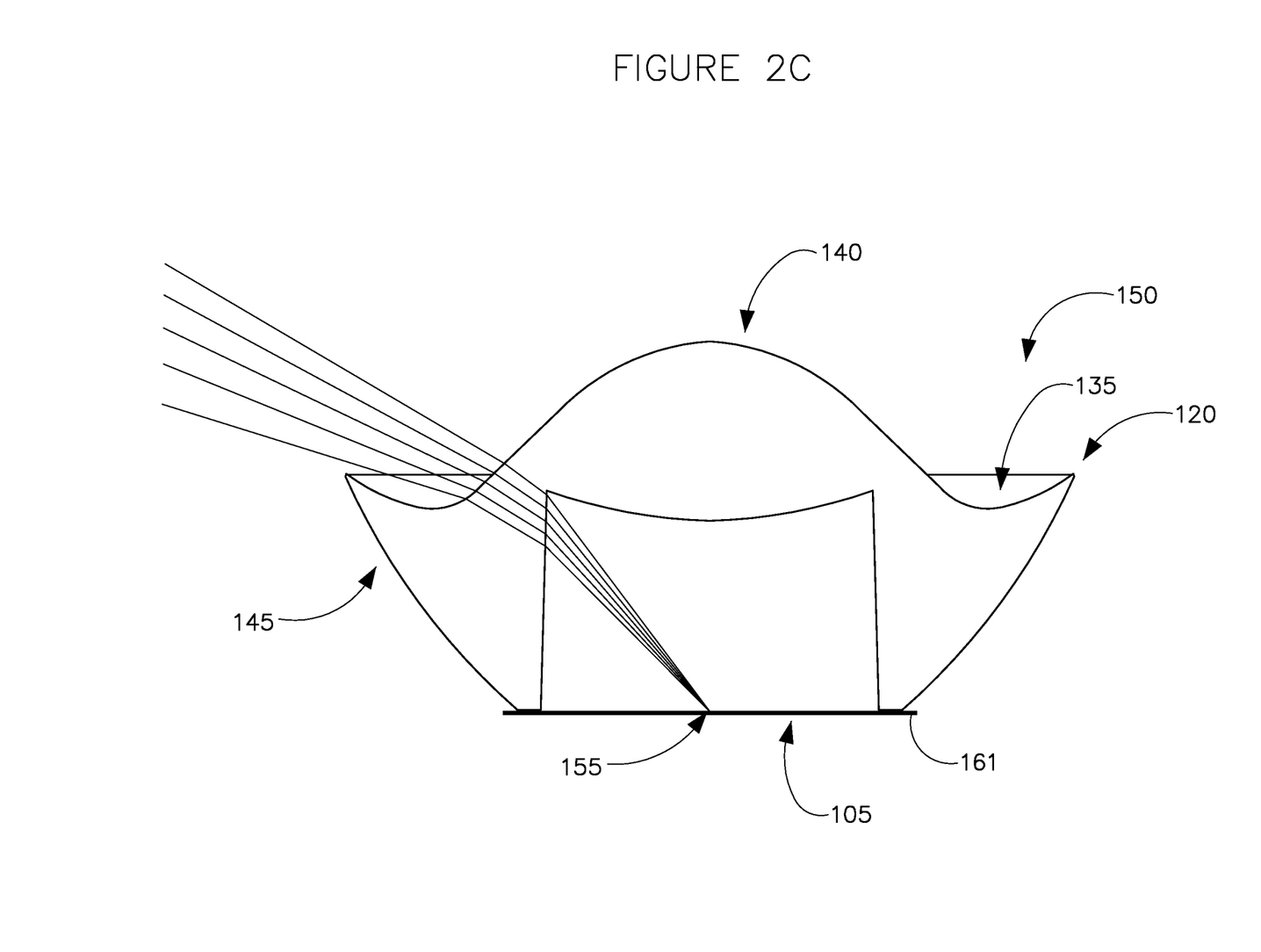

FIGS. 2A, 2B, and 2C (collectively FIG. 2) illustrate a side cross sectional view of an example embodiment of the optic 150 overlaid with representative rays from a light source 155. The light source 155 can comprise one or more light emitting diodes and is represented as a point source in the figures. Each of the FIGS. 2A, 2B, and 2C illustrates representative rays from a distinct solid angle of point-source-emitted light to facilitate reader viewing of the rays. Although illustrated as a point source for simplicity in the figures, the light source can be any one of a variety of light sources, including but not limited to a discrete LED, multiple LEDs, a chip on board LED, or an organic LED. One advantage of the example optical systems described herein is that they can accommodate a relatively larger light source without requiring a corresponding increase in the size of the optical system. In other words, the size of the optic and the reflector can be maintained relatively small while being able to process light from a light source having a larger size.

Figure 3A:
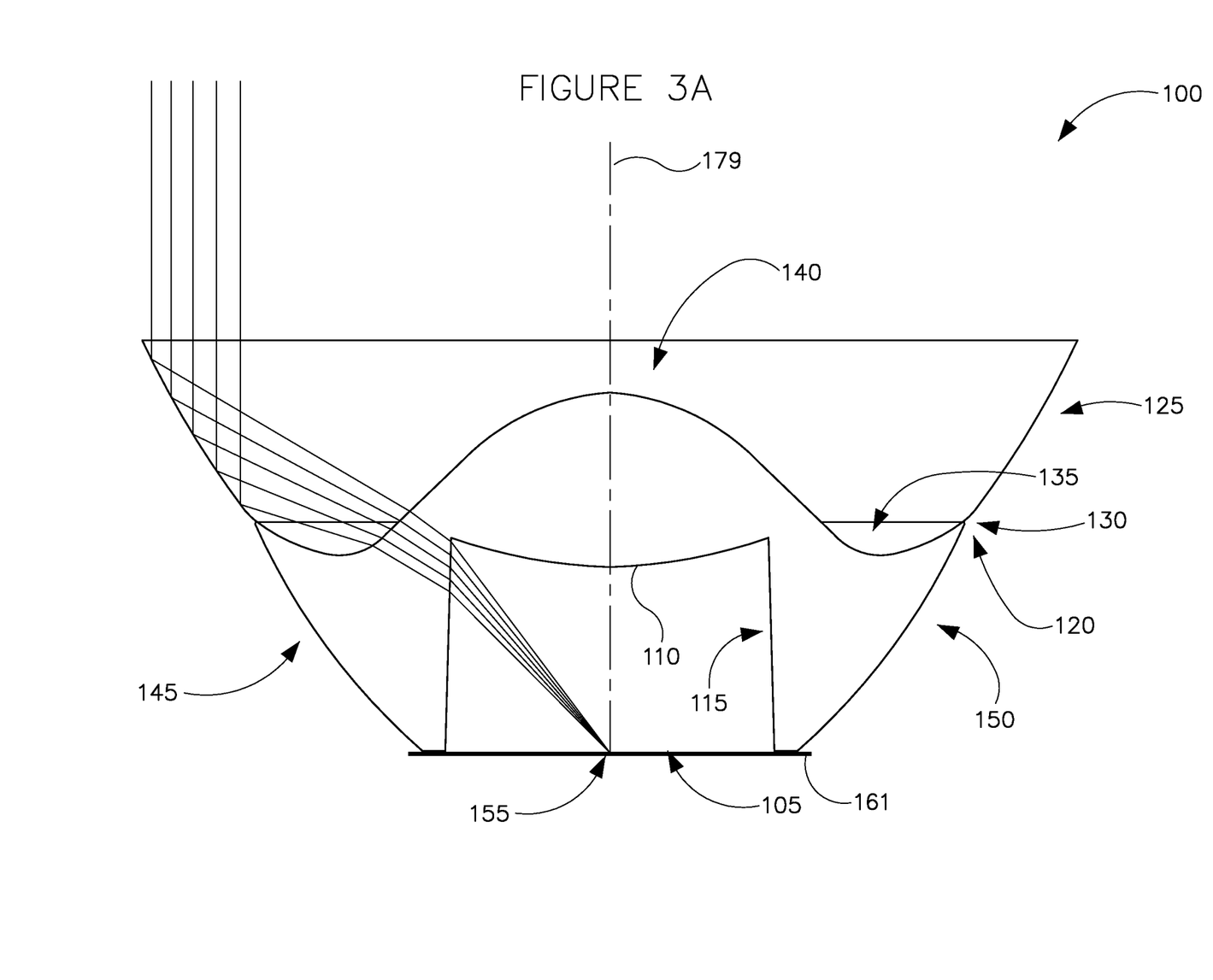
FIGS. 3A and 3B illustrate side cross sectional views of the optical system of FIG. 1A overlaid with representative ray traces from a light source in accordance with an example embodiment of the present disclosure.
Figure 3B:
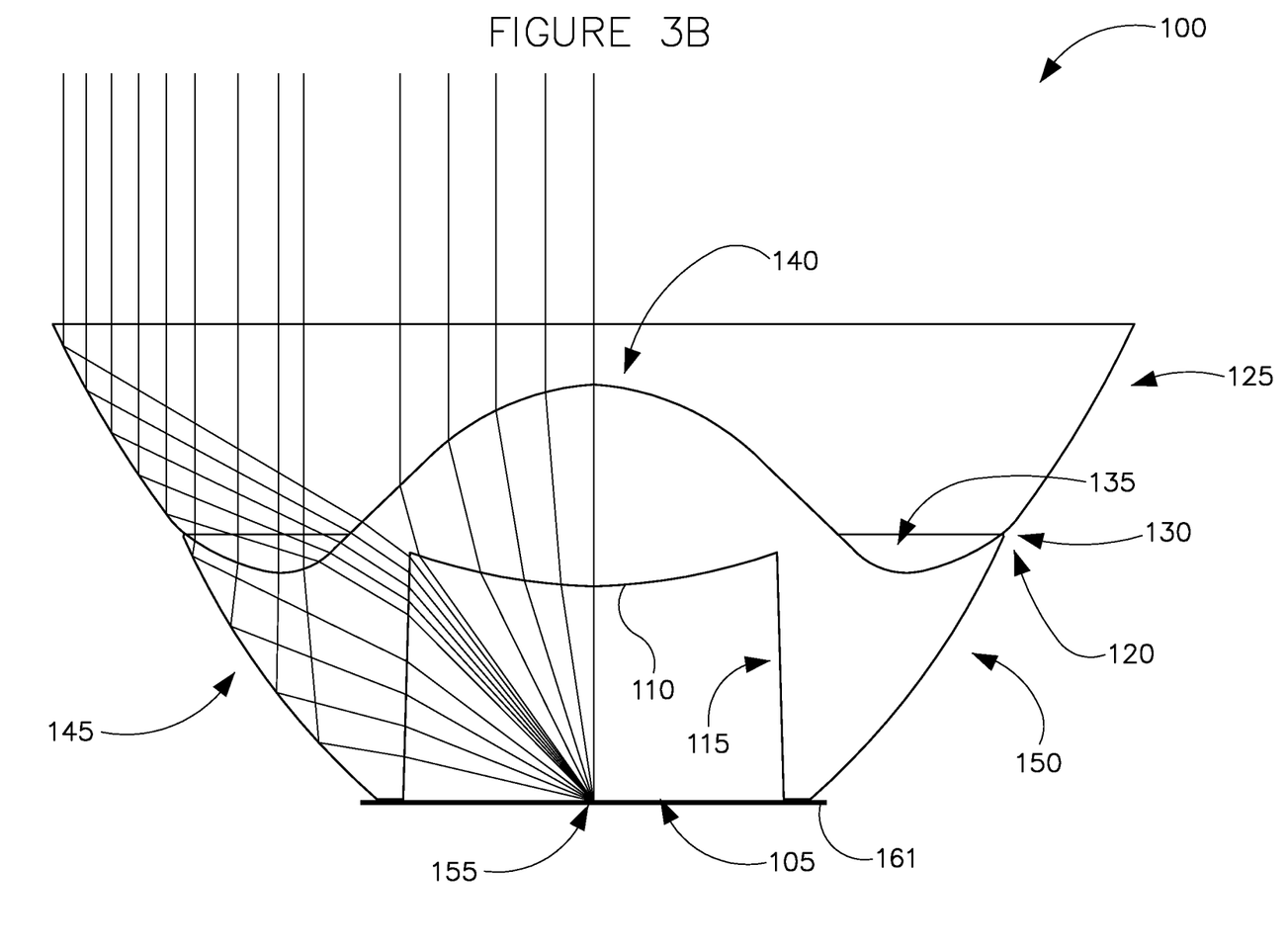

FIGS. 3A and 3B illustrate a side cross sectional view of an example embodiment of the optical system 100 overlaid with representative rays from the light source 155.

As can be best seen in FIGS. 1B and 2A, the optical system 100 is configured for mounting to a substrate 161, such as a circuit board or other appropriate element that may provide structural support. The substrate 161 extends along a reference plane 160. The light source 155 may be mounted directly to the substrate 161 in some example embodiments. The optic 150 may also be mounted directly to the substrate 161 in some example embodiments. In some other example embodiments, the optic 150 is attached to the light source 155, and the resulting unit is attached directly to the substrate 161.

The reflector 125, which will be discussed in further detail below, may be attached directly to the optic 150 or may be attached directly to the substrate 161. In the example of attaching directly to the substrate 161, the optic 150 and the reflector 125 may either be in contact with one another or separated slightly from one another, for example with a separation of less than about 0.5 mm or 1.0 mm. In some embodiments, the optic 150 and the reflector 125 are separately attached to the substrate 161 in a manner that avoids physical contact with any optical surfaces of the optic 150 that would impede the intended optical function of the optic 150.

In the illustrated embodiment, and as can be seen in FIGS. 2B and 3A, the optic 150 and the reflector 125 can be rotationally symmetrical about an axis 179. The axis 170 can comprise an optical axis of the optic 150, the reflector 125, and the light source 155.

As can be seen in the cross sectional view of FIG. 3A (and other figures), in the illustrated embodiment, the optic 150 comprises a cavity 105 that is oriented to receive light from the light source 155. The cavity 105 has an opening that receives light from the light source 155 and a sidewall 115 (for example, if the cavity is cylindrical), or multiple sidewalls, that extend into the body of the optic 150. The bottom of the cavity 105 is contoured to from a convex surface 110 that condenses incident light as can be best seen in FIG. 3B.

In the illustrated embodiment, the optic 150 further comprises a totally internally reflective surface 145. As can be seen in the cross section of FIG. 3B (among other figures), the totally internally reflective surface 145 extends circumferentially or peripherally around the cavity 105.

As shown in FIG. 2A, the illustrated example optic 150 comprises a rear surface 177 that circumscribes the cavity 105 and may be positioned against or along the substrate 161, so that the rear surface 177 extends along or is in the reference plane 160. As illustrated, the totally internally reflective surface 145 of the optic 150 is curved in cross section and extends laterally from the rear surface 177 to a rim 120 on the optic 150.

The optic 150 further comprises a light-emitting side (front side) that is on the side opposite the rear surface 177 and the light-emitting side is circumscribed by the rim 120. As illustrated, the light-emitting side of the optic 150 comprises a centrally located convex region 140 and a concave region 135. The concave region 135 is disposed adjacent the rim 120 and extends peripherally around the convex region 140. In the illustrated example, the concave region 135 can be characterized as a groove. As further shown in the example of FIGS. 1A-3B, the convex region 140 and the concave region 135 form a continuous smooth surface (or curve as viewed in cross section) without abrupt changes in the surface as it extends from the rim 120 on one side of the optic 150 along the light-emitting side to the rim 120 on the opposite side of the optic 150.

As shown in the cross sectional view of FIG. 2A, in the illustrated example, the concave region 135 has a concave region bottom that is disposed a first distance 167 from the reference plane 160. The center or apex of the centrally located convex region 140 is disposed a second distance 165 from the reference plane 160. The rim 120 is disposed a third distance 166 from the reference plane 160. In the illustrated example, the first distance 167 between the bottom of the concave region 135 and the reference plane 160 is less than both of the second distance 165 and the third distance 166. The third distance 166 is between the first distance 167 and the second distance 165.

As another way of characterizing a representative geometry of the illustrated example optic 150, the concave region 135 may have a fluid-holding form. In other words, while the concave region 135 provides an optical function, the shape and orientation of the concave region 135 may be formed in a manner that could function as a vessel for fluid. More specifically, as illustrated, the concave region 135 and the optic 150 are configured such that the reference plane 160 can be situated horizontal with respect to gravity, and the optic 150 can be oriented to rest on the reference plane (as depicted in FIG. 2A without limitation). In this hypothetical configuration, the concave region 135 has a form and orientation with respect to gravity such that a liquid placed in the concave region 135 could remain in the concave region 135.

Figure 5:
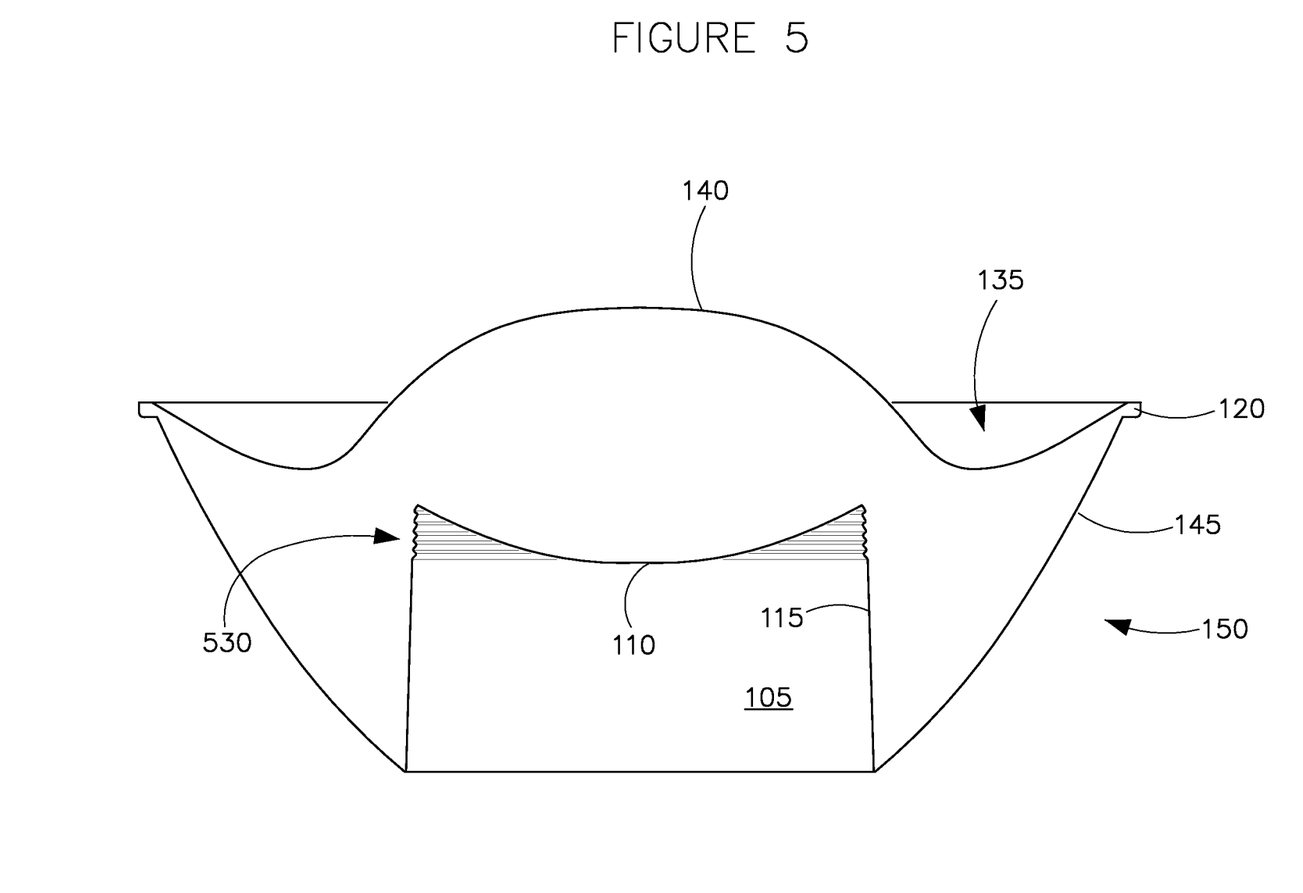
FIG. 5 illustrates a side cross sectional view of an optic in accordance with another example embodiment of the present disclosure.

As illustrated in FIGS. 1 and 3, the example reflector 125 of the optical system comprises a tapered reflective surface that is oriented to receive, process, and emit light that is emitted from the optic 150. In one embodiment, the reflector is designed to reflect light diffusely and can be made of white plastic, a metallized plastic, or a spun metal. In cross section or side view, the reflector 125 is curved in the illustrated example. As illustrated, the light-receiving end of the reflector 125 and the rim 120 adjoin one another to form an interface 130. At the opposite end, light exits the reflector 125 at the light-emitting end of the reflector. In the example illustrated embodiment, the reflector 125 butts up to the rim 120 at the interface 130. In the illustrated embodiment, the reflector 125 and the rim 120 can be joined using a variety of mechanisms such as co-molding the two components or forming a notch for one component to fit within the other. Other example mechanisms for joining the two components are described in connection with the embodiments shown in FIGS. 5 and 8. In yet other embodiments, the reflector 125 may be attached to the substrate 161 and may or may not contact the optic 150. In other words, in some embodiments, there may be a small gap between the rim 120 of the optic 150 and the reflector 125.

The reflector 125 and the optic 150 can be formed so that the totally internally reflective surface 145 of the optic 150 and the reflective surface of the reflector 125 curve inward at the interface 130. For example, as illustrated in FIG. 1B, in some embodiments, a line 170 may be drawn tangent to an outer surface of the reflector 125 and further tangent to the totally internally reflective surface 145 of the optic 150. At the interface 130, the totally internally reflective surface 145 and the reflective surface can be displaced from that tangent line 170 so that a gap 175 exists.

As shown in FIG. 2A, the convex surface 110 and the convex region 140 cooperatively collimate a solid angle of light emitted by a point source model of the light source 155. As shown in FIG. 2B, another solid angle of light emitted by the light source 155 passes through the sidewall 115 and is reflected forward by the totally internally reflective surface 145 to produce additional collimated light.

Figure 4:
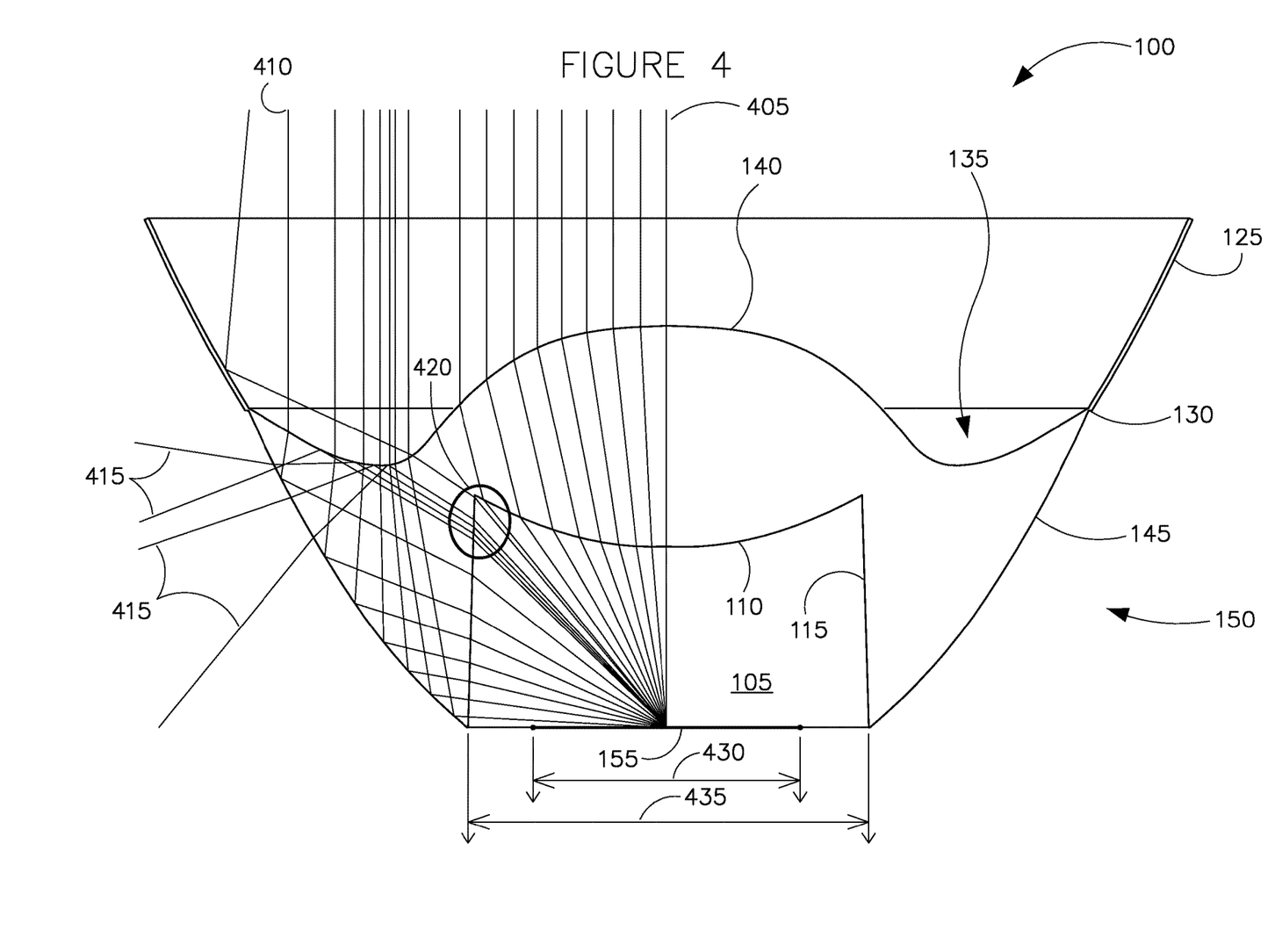
FIG. 4 illustrates a side cross sectional view of the optical system of FIG. 1A overlaid with representative ray traces from a light source in accordance with an example embodiment of the present disclosure.

As shown in FIG. 2C, another solid angle of light emitted by the light source 155 transmits through the sidewall 115 and exits the optic 150 at or adjacent to the concave region 135. As shown in FIG. 3A, the reflector 125 reflects that light and directs it forward to produce additional collimated light. As shown in FIG. 3B, the composite output of the optical system 100 collimates the light produced by the light source 155 when modeled as a point source. When the light source 155 is physically implemented as a large chip-on-board light emitting diode, the optical system 100 can manage the high output of light and deliver desirably uniform illumination in some example embodiments. For example, as illustrated in FIG. 4, in certain embodiments, the light source 155 can have an area that is more than half the area of the opening to the cavity 105, but the design of the optical system 100 is able to deliver desirably uniform illumination that is largely collimated. As measured another way and as further illustrated in FIG. 4, the light source 155 can have a diameter at its widest point (the widest light source diameter 430), which can be more than half the diameter of the cavity 105 at its widest point (the widest cavity diameter 435). In yet other embodiments, the widest light source diameter 430 can be more than three-quarters of the widest cavity diameter 435.

Referring now to FIGS. 4 through 8, alternate example embodiments of the present disclosure will be discussed. FIG. 400 illustrates optical system 100 with many of the same features that have been explained previously and will not be repeated. The optical system 100 generates collimated beams of light illustrated by rays 405 and 410 in FIG. 4. However, as further illustrated in FIG. 4, in certain embodiments light rays 415 may be emitted that are not collimated. That is, light rays 415 are refracted by region 420 of the optic 150 in a manner such that the light rays exit the optic through the totally internally reflective surface 145 or are reflected by the totally internally reflective surface 145 back into the optic 150. This refraction of light rays 415 reduces the efficiency of the optical system 100 and may create undesired light patterns.

Figure 6:
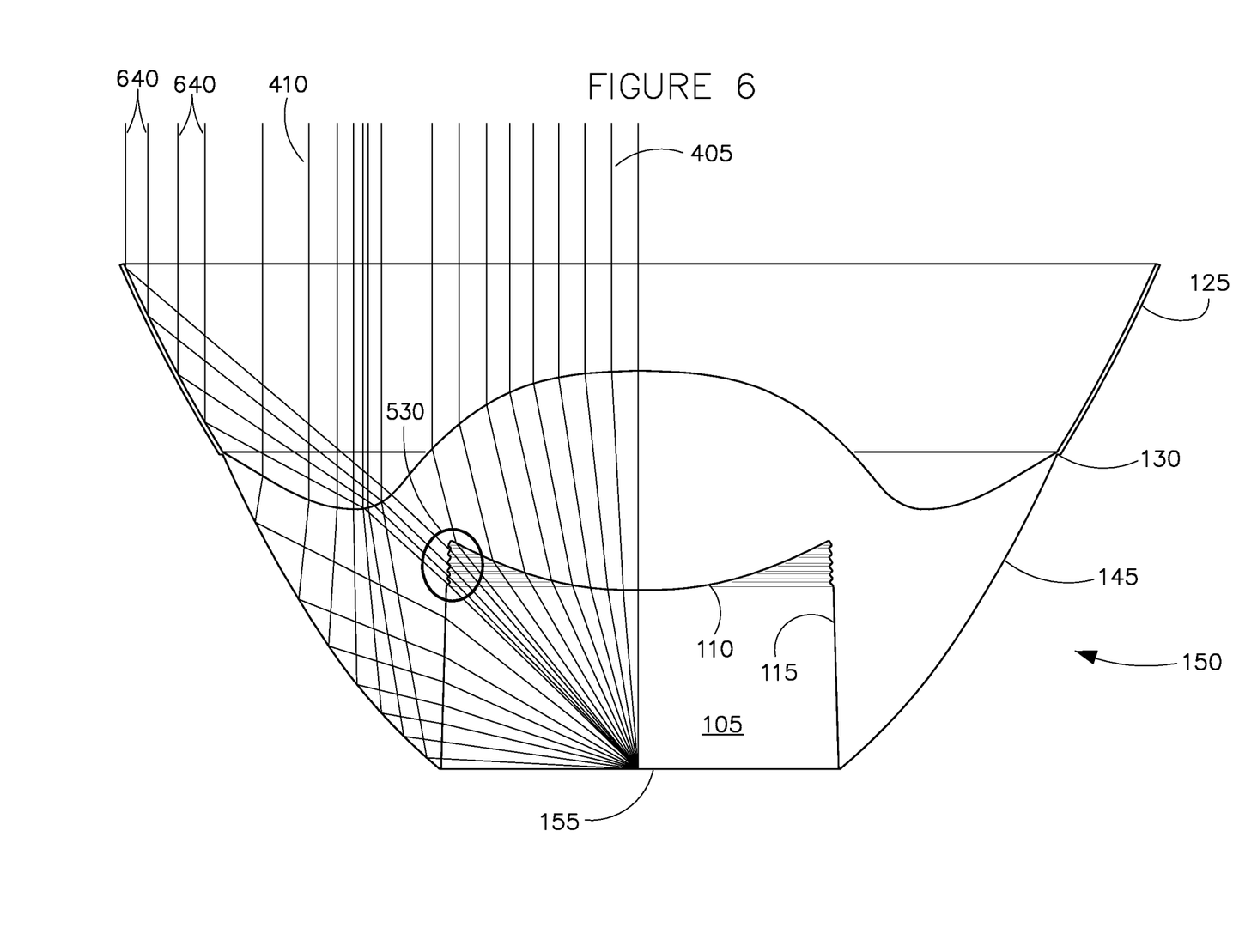
FIG. 6 illustrates a side cross sectional view of an optical system comprising the example optic of FIG. 5 and overlaid with representative ray traces from a light source in accordance with an example embodiment of the present disclosure.
Figure 7:
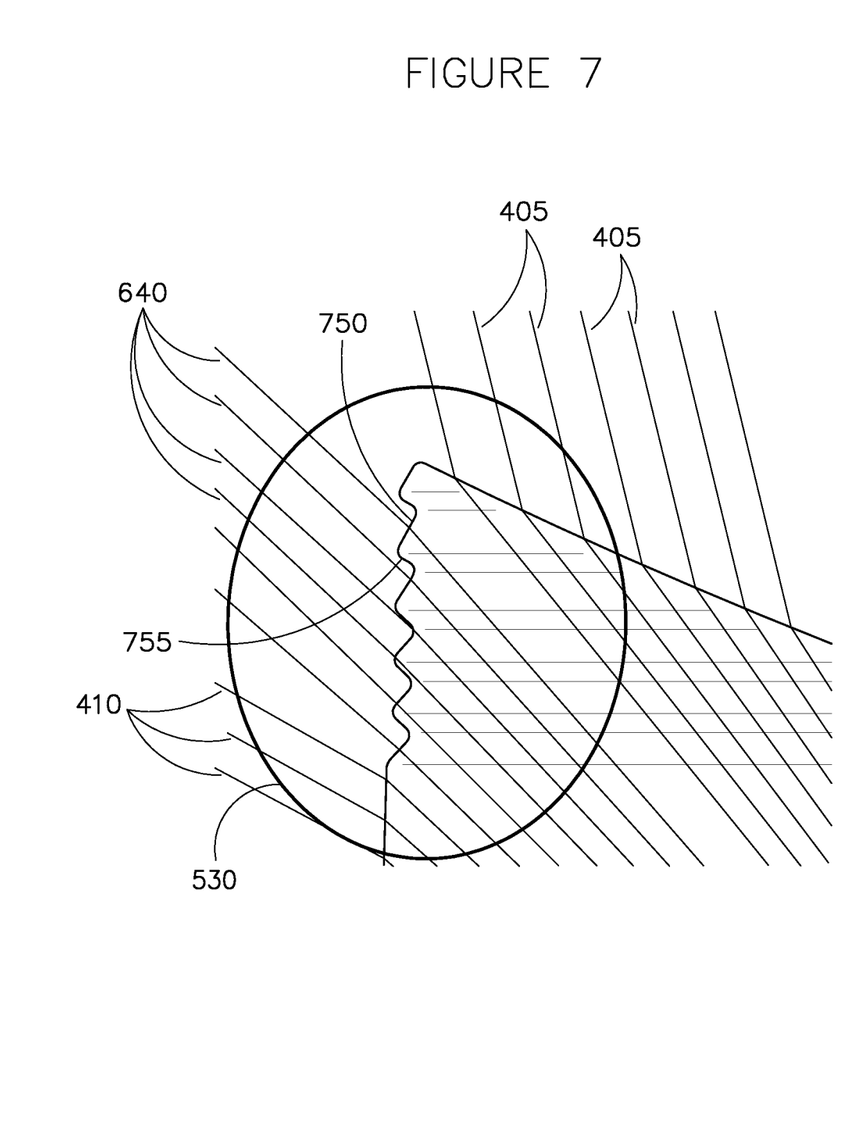
FIG. 7 illustrates an enlarged side cross sectional view of a portion of the example optic of FIG. 5 overlaid with representative ray traces from a light source in accordance with an example embodiment of the present disclosure.

To address the scattered light rays 415 illustrated in FIG. 4, alternate embodiments of the optic 150 are illustrated in FIGS. 5 through 8 that include facets to minimize the refraction of light rays passing through the sidewall 115 near the convex surface 110 of the cavity 105. Referring to the embodiments illustrated in FIGS. 5 through 8, many of the same features of the optical system are shown as were described in connection with FIGS. 1A through 3B and will not be repeated. However, the optic 150 of FIGS. 5 through 8 includes facets 530 along the sidewall 115 adjacent to the convex surface 110 of the cavity 105. It is in the region near the facets 530 that the light rays 415 of FIG. 4 are refracted and cause the unwanted scattering illustrated in FIG. 4. In order to minimize the unwanted scattering of light rays 415, the facets 530 minimize the refraction of light rays passing from the cavity 105 through the sidewall 115 near the convex surface 110 of the cavity 105. As shown in the enlarged view of the facets 530 provided in FIG. 7, the facets comprise a long face 750 and a short face 755. The long face 750 is at an angle greater than 0 degrees and less than 90 degrees relative to the sidewall 115. The facets 530 are shaped such that light rays 640 pass through the sidewall 115 at the long face 750 of the facets 530. As a result, the refraction of light rays 640 is minimized and those light rays are reflected by reflector 125 in a collimated manner as shown in FIG. 6. While the example embodiment of FIGS. 5 through 8 show the facets 530 with a long face 750 and a short face 755, in alternate embodiments the facets could take other forms or shapes to achieve the same objective of minimizing the scattered beams of light 415. In the example embodiment of FIGS. 5 through 8, the facets 530 are rotationally symmetric and extend along the entire sidewall 115 adjacent to the convex surface 110 of the cavity 105. However, in alternate embodiments, the facets can have alternate positions within the cavity 105.

Figure 8:
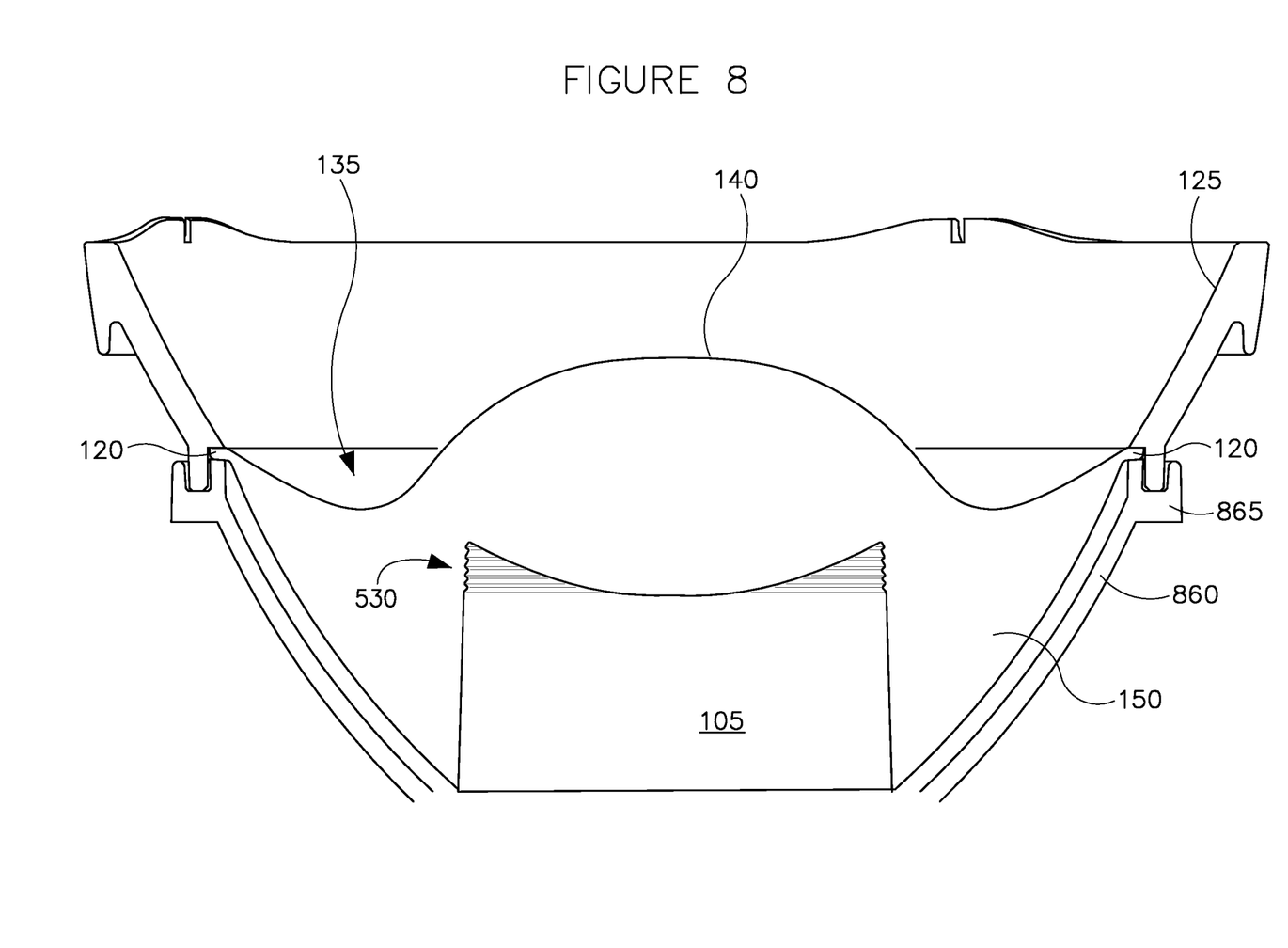
FIG. 8 illustrates a side cross sectional view of an optical system comprising the example optic of FIG. 5 in accordance with an example embodiment of the present disclosure.

Referring to FIG. 8, a particular embodiment of an optical system is illustrated. The embodiment illustrated in FIG. 8 includes many of the same features previously described and those descriptions will not be repeated. Additionally, the embodiment of FIG. 8 illustrates a reflector cup 860 in which the optic 150 sits. The reflector cup 860 is an optional feature that has a reflective inner surface that serves to reflect any stray light back towards the optic 150. The example reflector cup 860 shown in FIG. 8 also has a mount 865 that receives a boss extending downward from the reflector 125. In the example optic 150 shown in FIG. 8 (as well as in FIG. 5) the rim 120 is formed as a horizontal flange that is clamped between the mount 865 and the reflector 125 in order to couple the optic 150 and the reflector 125. As described previously, in other embodiments, the optic and the reflector can be secured using other mechanisms.

While illustrated as collimated, in various embodiments, the output distribution of light from the optical system 100 can be diverging, converging, directed off axis, fan out, biased laterally, cross a centerline, asymmetrical, or otherwise configured according to application parameters. While the illustrated embodiment is rotationally symmetrical as discussed above, other embodiments may be rotationally asymmetrical. In various embodiments, elements, features, and contours of the optical system 100 may be continuous, discontinuous, smoothly joined, or abruptly separated, for example an azimuthal direction. In some embodiments, texturing or micro-features can be added to optical surfaces to promote diffusion or spread of the light distribution pattern. Various forms of the reflector 125 can be utilized. For example, the reflector 125 can comprise surfaces or features that are specular, semi-specular, diffuse, colored, or coated with a dark paint or other light-absorbing material in accordance with design and usage parameters. In some embodiments, selected areas of the reflector 125 may be treated or masked such that light is controlled in different ways depending on which areas of the reflector are intended to be active.

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of this application. Although specific terms are employed herein, they are used in a generic and descriptive sense only and not for purposes of limitation.

What is claimed is:

1. An optic comprising:
a rear surface;
a cavity that is formed in the rear surface and that is configured to receive light from a light source; and
a front surface that opposes the rear surface, that is configured to emit light processed by the optic, and that comprises a centrally disposed convex region,
wherein the front surface and the rear surface meet to form a rim that extends peripherally with respect to the cavity,
wherein the front surface further comprises a concave region that is disposed between the rim and the centrally disposed convex region and that extends peripherally about the centrally disposed convex region, and
wherein the centrally disposed convex region and the concave region form a continuous smooth surface.

2. The optic of claim 1, wherein the cavity comprises at least one side wall, wherein the at least one side wall comprises a plurality of angled facets configured to reduce refraction of a portion of the light received from the light source, wherein each of the plurality of angled facets comprises a long face and a short face, and wherein the long face is at an angle greater than 0 degrees and less than 90 degrees relative to the at least one side wall.

3. The optic of claim 1, wherein the cavity is the only cavity formed in the rear surface, the cavity comprises a widest cavity diameter, and the light source comprises a widest light emitting diode diameter, wherein the widest light emitting diode diameter is less than the widest cavity diameter and more than one half of the widest cavity diameter.

4. The optic of claim 1, wherein a rear-most portion of the rear surface extends along a reference plane,
wherein the rim is disposed a first distance from the reference plane,
wherein a bottom of the concave region is disposed a second distance from the reference plane, and
wherein the first distance is greater than the second distance.

5. The optic of claim 1, wherein a rear-most portion of the rear surface extends along a reference plane,
wherein the rim is disposed a first distance from the reference plane,
wherein a rear-most portion of the concave region is disposed a second distance from the reference plane,
wherein a front-most portion of the front surface is disposed a third distance from the reference plane, and
wherein the first distance is between the second distance and the third distance.

6. The optic of claim 1, wherein the cavity comprises a second centrally disposed convex region.

7. The optic of claim 1, wherein the rear surface comprises a totally internally reflective surface that extends from the rim towards the cavity.

8. The optic of claim 1, wherein the rear surface comprises:
a flat surface that is disposed adjacent the cavity and that circumscribes the cavity; and
a curved internally reflective surface that extends from the flat surface to the rim and that circumscribes the cavity.

9. The optic of claim 8, wherein the flat surface is configured for positioning against a substrate, and
wherein the light source comprises at least one light emitting diode mounted to the substrate.

10. The optic of claim 1, wherein the rear surface comprises a first surface of rotation about a central axis of the optic,
wherein the front surface comprises a second surface of rotation about the central axis of the optic, and
wherein the rim is rotationally symmetrical about the central axis.

11. A system comprising:
an optic that comprises:
a rear surface;

a cavity that is formed in the rear surface and that is configured to receive light from a light source; and a front surface that opposes the rear surface, that is configured to emit light processed by the optic, and that comprises a centrally disposed convex region and a concave region surrounding the centrally disposed convex region, the centrally disposed convex region and the concave region forming a continuous smooth surface, wherein the front surface and the rear surface meet to form a rim that extends peripherally with respect to the cavity; and a reflector that is hollow, that is disposed adjacent the optic, and that comprises:
a light-receiving end adjoining the rim;
a light-emitting end; and
a tapered region that extends between the light-receiving end and the light-emitting end.

12. The system of claim 11, wherein the rear surface of the optic comprises an internally reflective surface that extends peripherally about the cavity and that extends from the rim towards the cavity, and
wherein the tapered region of the reflector comprises a reflective surface that is oriented to reflect a portion of the light processed by the optic.

13. The system of claim 12, wherein a first region of the internally reflective surface adjoins the rim,
wherein a second region of the reflective surface adjoins the light-receiving end, and
wherein the internally reflective surface and the reflective surface are contoured so that the first region of the internally reflective surface and the second region of the reflective surface are displaced from a line taken tangent to the internally reflective surface and tangent to an outer surface of the reflector.

14. The system of claim 11, wherein the cavity comprises at least one side wall, wherein the at least one side wall comprises a plurality of angled facets configured to reduce refraction of a portion of the light received from the light source, wherein each of the plurality of angled facets comprises a long face and a short face, and wherein the long face is at an angle greater than 0 degrees and less than 90 degrees relative to the at least one side wall.

15. The system of claim 11, wherein the cavity is the only cavity formed in the rear surface, the cavity comprises a widest cavity diameter, and the light source comprises a widest light emitting diode diameter, wherein the widest light emitting diode diameter is less than the widest cavity diameter and more than one half of the widest cavity diameter.

16. A lighting system comprising:
a substrate;
at least one light emitting diode mounted to the substrate;
an optic mounted to the substrate and comprising:
a cavity that is disposed to receive light from the at least one light emitting diode;
a totally internally reflective surface that extends circumferentially about the cavity;
a refractive surface that is disposed to emit an emitted light; and
a rim that is formed between the totally internally reflective surface and the refractive surface;
a hollow reflector comprising:
a light-receiving end that adjoins the rim; and
a light-emitting end; and
a reflector cup surrounding the optic and supporting the hollow reflector, wherein the rim is clamped between the hollow reflector and the reflector cup.

17. The lighting system of claim 16, wherein the hollow reflector is mounted to the substrate so that physical contact between the optic and the hollow reflector occurs only at the rim.

18. The lighting system of claim 16, wherein the hollow reflector is mounted to the substrate so that a gap exists between the light-receiving end of the hollow reflector and the rim.

19. The lighting system of claim 16, wherein the cavity comprises at least one side wall, wherein the at least one side wall comprises a plurality of angled facets configured to reduce refraction of a portion of the light received from the light source, wherein each of the plurality of angled facets comprises a long face and a short face, and wherein the long face is at an angle greater than 0 degrees and less than 90 degrees relative to the at least one side wall.

20. The lighting system of claim 16, wherein the cavity is the only cavity formed in the rear surface, the cavity comprises a widest cavity diameter and the light source comprises a widest light emitting diode diameter, wherein the widest light emitting diode diameter is less than the widest cavity diameter and more than one half of the widest cavity diameter.

* * * * *